US008412818B2

(12) United States Patent
Frantz et al.

(10) Patent No.: US 8,412,818 B2
(45) Date of Patent: Apr. 2, 2013

(54) METHOD AND SYSTEM FOR MANAGING RESOURCES WITHIN A PORTABLE COMPUTING DEVICE

(75) Inventors: Andrew J. Frantz, Boulder, CO (US); Dianne D. Horn, Boulder, CO (US); Joshua H. Stubbs, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 13/069,052

(22) Filed: Mar. 22, 2011

(65) Prior Publication Data
US 2012/0158968 A1    Jun. 21, 2012

Related U.S. Application Data

(60) Provisional application No. 61/425,683, filed on Dec. 21, 2010.

(51) Int. Cl.
*G06F 15/173* (2006.01)
(52) U.S. Cl. .................... 709/224; 709/226; 710/19
(58) Field of Classification Search .......... 709/224, 709/226, 213; 710/19, 11, 200, 240; 711/130; 713/323; 712/31
See application file for complete search history.

(56) References Cited

U.S. PATENT DOCUMENTS

| 5,210,828 | A   | 5/1993  | Bolan et al.             |
|-----------|-----|---------|--------------------------|
| 5,307,496 | A * | 4/1994  | Ichinose et al. ... 709/226 |
| 6,085,276 | A * | 7/2000  | VanDoren et al. ... 710/240 |
| 7,080,267 | B2  | 7/2006  | Gary et al.              |
| 7,139,855 | B2* | 11/2006 | Armstrong et al. ... 710/200 |
| 7,685,147 | B2  | 3/2010  | D'Alo et al.             |
| 2001/0025312 | A1* | 9/2001 | Obata ... 709/226        |
| 2002/0032850 | A1* | 3/2002 | Kauffman ... 712/31      |
| 2002/0087897 | A1  | 7/2002  | Cline et al.             |
| 2005/0149629 | A1  | 7/2005  | Kidd et al.              |
| 2005/0273633 | A1  | 12/2005 | Wilcox et al.            |
| 2005/0273635 | A1  | 12/2005 | Wilcox et al.            |
| 2006/0053326 | A1* | 3/2006  | Naveh et al. ... 713/323 |
| 2006/0123252 | A1  | 6/2006  | Vaidya et al.            |

(Continued)

FOREIGN PATENT DOCUMENTS

| EP | 0640929 A2 | 3/1995 |
| WO | WO2007017664 A1 | 2/2007 |
| WO | WO2008009366 A1 | 1/2008 |

OTHER PUBLICATIONS

International Search Report and Written Opinion—PCT/US2011/059618—ISA/EPO—Feb. 2, 2012.

(Continued)

*Primary Examiner* — Le H Luu
(74) *Attorney, Agent, or Firm* — Nicholas A. Cole

(57) ABSTRACT

A method and system for managing requests to resources among processors of a portable computing device ("PCD") includes each master processor identifying a plurality of resources of the PCD in a storage device, such as a message RAM. This message RAM is part of the PCD. A master processor may identify desired states for the plurality of resources in the message RAM. Then, the master processor may generate an alert that the plurality of resources and desired states for resources have been set in the message RAM. After receiving the alert, a controller may determine if one or more previous requests have been processed to completion. If so, then the controller may review the contents of the message RAM to identify the plurality of resources and to identify the desired states of the resources. If appropriate, the controller may pass the desired states to the plurality of resources.

36 Claims, 9 Drawing Sheets

U.S. PATENT DOCUMENTS

2007/0220182 A1* 9/2007 Telesco .......................... 710/11
2011/0179132 A1* 7/2011 Mayo et al. ................... 709/213
2012/0005430 A1* 1/2012 Watanabe et al. ............. 711/130
2012/0131180 A1* 5/2012 Nomura et al. ............... 709/224

OTHER PUBLICATIONS

Satyanarayanan, "Special Feature: Commercial Multiprocessing Systems", Computer, May 1, 1980, vol. 13, No. 5, pp. 75-96, IEEE Service Center, XP011356952, ISSN: 0018-9162, DOI: 10.1109/MC.1980.1653626.

Van Der Wal A J et al., "Efficient interprocessor communication in a tightly-coupled homogeneous multiprocessor system", Proceedings of Second IEEE Workshop on Future Trends of Distributed Computing Systems, Sep. 30, 1990, IEEE computer society, pp. 362-368, XP010021448, DOI: 10.1109/FTDCS.1990.138347.

* cited by examiner

105J

NOTIFICATION META-RESOURCE FOR EACH MASTER

|  | SR#1 | SR#2 | SR#N | LR#1 |
|---|---|---|---|---|
| CONFIG. | 0 | 0 | 0 | 1 |
| REGISTERED | 0 | 1 | 0 | 1 |

FIG. 7A

PRIMARY — 105J1

|  | SR#1 | SR#2 | SR#N | LR#1 |
|---|---|---|---|---|
| CONFIG. | 1 | 0 | 0 | 1 |
| REGISTERED | 1 | 0 | 0 | 1 |

SLEEP1 — 105J2

|  | SR#1 | SR#2 | SR#N | LR#1 |
|---|---|---|---|---|
| CONFIG. | 0 | 0 | 0 | 0 |
| REGISTERED | 0 | 0 | 0 | 0 |

SLEEP2 — 105J3

|  | SR#1 | SR#2 | SR#N | LR#1 |
|---|---|---|---|---|
| CONFIG. | 1 | 0 | 0 | 1 |
| REGISTERED | 0 | 0 | 0 | 1 |

FIG. 7B

METHOD AND SYSTEM FOR MANAGING RESOURCES WITHIN A PORTABLE COMPUTING DEVICE

PRIORITY AND RELATED APPLICATIONS STATEMENT

This application claims priority under 35 U.S.C. §119(e) to U.S. Provisional Patent Application Ser. No. 61/425,683, filed on Dec. 21, 2010, entitled, "Method and system for managing resources within a portable computing device." The entire contents of this U.S. Provisional Patent Application are hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

PCDs typically have complex and compact electronic packaging that is generally made of multiple processing units that include central processing units, digital signal processors, and the like. Conventional PCD's currently use a remote procedure call ("RPC") protocol as understood by one of ordinary skill the art. The RPC protocol manages resource requests among different processing units within a PCD. One problem with the RPC protocol is that the protocol is often very slow for managing resource requests among multiple processing units within a PCD. Another problem with the RPC protocol is that the protocol may not efficiently support low-level power states that are critical for PCDs to conserve battery power.

Accordingly, what is needed in the art is a method and system for more efficiently managing resource requests among multiple processing units within a PCD while achieving increased energy conservation. There is also a need in the art for an interprocessor communication protocol that increases the speed in which requests among processing units may be handled.

SUMMARY

A method and system for managing requests to resources among processors of a portable computing device ("PCD") includes each master processor identifying a plurality of resources of the PCD in a storage device, such as a message RAM. This message RAM is part of the PCD. A master processor may identify desired states for the plurality of resources in the message RAM. Then, the master processor may generate an alert that the plurality of resources and desired states for resources have been set. After receiving the alert, a controller may determine if one or more previous requests have been processed to completion. If so, then the controller may review the contents of message RAM to identify the plurality of resources and to identify the desired states of the resources.

When appropriate, the controller may pass the desired states to the plurality of resources. The controller may also determine if a desired state exceeds a limit of a resource and if the desired state exceeds the limit, then the controller may adjust a value of the desired state so that the value falls within the limit of the resource.

The system also includes establishing a meta-resource comprising a table. This table may list a plurality of resources and fields that indicate whether a processor should be notified by a controller of status changes to the resources. Based on values in the meta-resource that are assigned to each master processor of the PCD, the controller may send alerts of status changes for resources to one or more processors.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIGS. 7A-7B illustrate tables that are part of notification meta-resources for processors.

DETAILED DESCRIPTION

Figure 1:
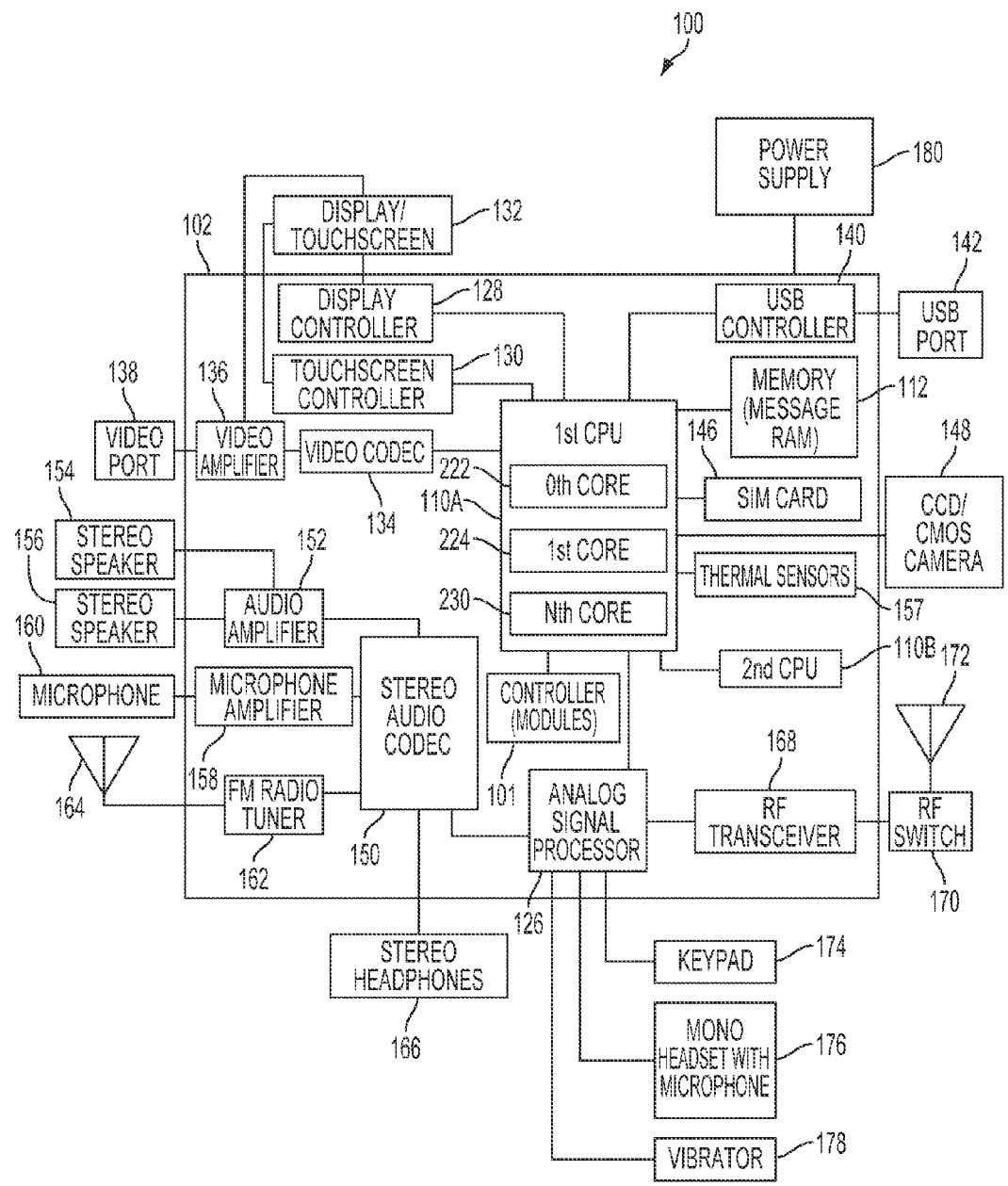
FIG. 1 is a functional block diagram illustrating an embodiment of a portable computing device (PCD)

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, and a laptop computer with a wireless connection, among others.

FIG. 1: Interprocessor Communication Elements of PCD 100

Referring to FIG. 1, this figure is a functional block diagram of an exemplary, non-limiting aspect of a PCD 100 in the form of a wireless telephone for implementing methods and systems for managing resources among processors 110, 126 of the PCD 100. As shown, the PCD 100 includes an on-chip system 102 that includes a multi-core, first central processing unit ("CPU") 110A, a second CPU 110B that is a single-core type, and an analog signal processor 126. These processors 110A, 110B, and 126 may be coupled together. The first CPU 110A may comprise a zeroth core 222, a first core 224, and an Nth core 230 as understood by one of ordinary skill in the art. In an alternate embodiment, instead of using two CPUs 110, two digital signal processors ("DSPs") may also be employed as understood by one of ordinary skill in the art.

FIG. 1 includes one or more controller module(s) 101. For the remainder of this description, the controller module(s) 101 will be referred to in the singular, as a controller 101, and not plural. One of ordinary skill in the art will recognize that the controller 101 may be divided into various parts and executed by different processors 110, 126 without departing from the invention. Alternatively, the controller 101 may be organized as a single element and executed by a single processor 110 or 126.

The controller 101 may comprise software which is executed by the CPUs 110. However, the controller 101 may also be formed from hardware and/or firmware as understood by one of ordinary skill in the art.

In general, the controller 101 may be responsible for supporting interprocessor communications, such as managing requests for resources that originate from the CPUs 110 and the processor 126. In one exemplary embodiment, the controller 101 supports an interprocessor communication protocol that manages resource requests among one or more master processors 110, 126. Resource requests may be issued by a master processor 110 to request an action or function from a resource.

Resources may include clocks and other low-level processors that support tasks, commands, and features of software applications that are executed by one or more master processors 110, 126. The controller 101 may be designed to prevent resource request conflicts among a plurality of master processors 110, 126.

FIG. 1 shows that the PCD 100 may include memory or message RAM 112. The controller 101 running on the CPUs 110 may access the message RAM 112 to manage resources 105 (See FIG. 2) as will be described in further detail below.

In a particular aspect, one or more of the method steps described herein may implemented by executable instructions and parameters stored in the memory 112 that form the controller 101. These instructions that form the controller 101 may be executed by the CPUs 110, the analog signal processor 126, or another processor. Further, the processors, 110, 126, the memory 112, the instructions stored therein, or a combination thereof may serve as a means for performing one or more of the method steps described herein.

FIG. 1: Other Elements of the PCD 100

As illustrated in FIG. 1, the CPU 110 may also be coupled to one or more internal on-chip or external off-chip thermal sensors 157. The on-chip thermal sensors 157 may comprise one or more proportional to absolute temperature ("PTAT") temperature sensors that are based on vertical PNP structure and are usually dedicated to complementary metal oxide semiconductor ("CMOS") very large-scale integration ("VLSI") circuits. Off-chip thermal sensors 157 may comprise one or more thermistors. The thermal sensors 157 may produce a voltage drop that is converted to digital signals with an analog-to-digital converter ("ADC") controller. However, other types of thermal sensors 157 may be employed as understood by one of ordinary skill in the art.

A display controller 128 and a touchscreen controller 130 are coupled to the digital signal processor 110. A touchscreen display 132 external to the on-chip system 102 is coupled to the display controller 128 and the touchscreen controller 130.

FIG. 1 is a schematic diagram illustrating an embodiment of a portable computing device (PCD) that includes a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134. The video codec 134 is coupled to the multicore central processing unit ("CPU") 110. A video amplifier 136 is coupled to the video encoder 134 and the touchscreen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102.

Figure 2:
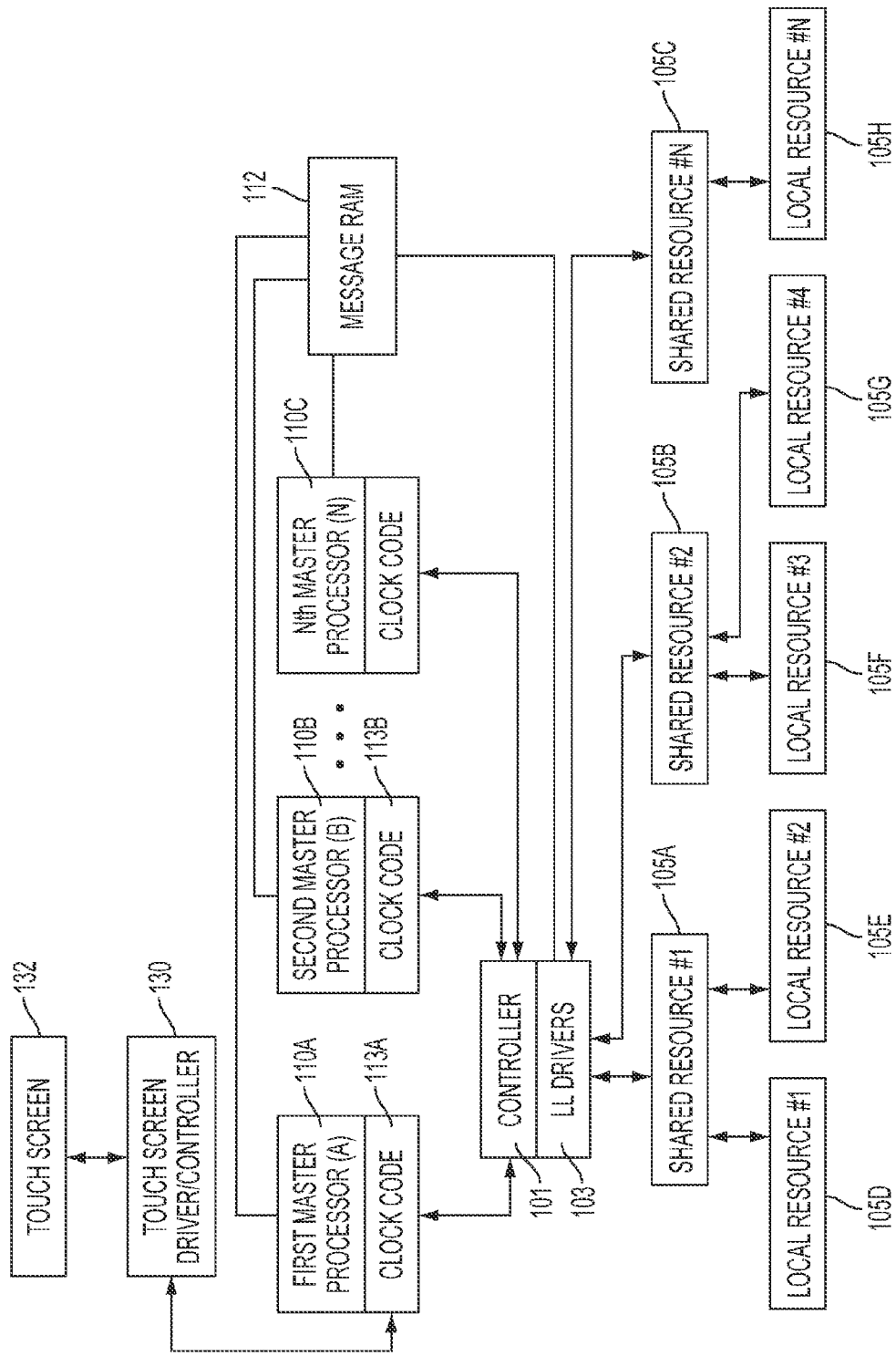
FIG. 2 is a functional block diagram illustrating relationships among the controller, master processors, low-level drivers, shared resources, and local resources.

FIG. 2 is a functional block diagram illustrating relationships among the controller 101, master processors 110, 126, low-level drivers 103, shared resources 105A-C, and local resources 105D-H. This figure illustrates a how the touchscreen 132 may be coupled to the touchscreen driver/controller 130. The touchscreen driver/controller 130 may be coupled to clock code 113A of a first master processor 110A.

The first master processor 110A may be coupled to message RAM 112 and the controller 101. The controller 101 may be coupled to the clock code 113A of the first master processor 110A and the controller 101 may comprise one or more low-level drivers 103. The one or more low-level drivers 103 may be responsible for communicating with one or more shared resources 105A-C. Shared resources 105A-C may comprise any type of device that supports tasks or functions of a master processor 110. Shared resources 105A-C may include devices such as clocks of other processors as well as single function elements like graphical processors, decoders, and the like.

The shared resources 105A-C may be coupled to one or more local resources 105D-H. The one or more local resources 105D-H may be similar to the shared resources 105A-C in that they may comprise any type of device that supports tasks or functions of a master processor 110. Local resources 105D-H may include devices such as clocks of other processors as well as single function elements like graphical processors, decoders, and the like. The local resources 105D-H may comprise leaf nodes. Leaf nodes are understood by one of ordinary skill in the art as local resources 105D-H that are not referred to or dependent upon other resources 105.

The controller 101 may be responsible for managing requests that are issued from the one or more master processors 110, 126. For example, the controller 101 may manage a request that originates from the first master processor 110A. The first master processor 110A may issue this request in response to an operator manipulating the touchscreen 132. The touchscreen 132 may issue signals to the touchscreen driver/controller 130. The touchscreen driver/controller 130 may in turn issue signals to the clock code 113A of the first master processor 110A.

In the exemplary embodiment illustrated in FIG. 2, prior to first the master processor 110A issuing a request to the controller 101, the first master processor 110A sends information to the message RAM 112 as will be described in further detail below. After the first master processor 110A sends information to the message RAM 112, then the first master processor 110A issues a request to the controller 101 to review the information stored in message RAM 112.

Based on the information contained within the message RAM 112, the controller 101 may issue the request originating from the first master processor 110A to one or more low-level drivers 103. The low-level drivers 103, in turn, issue commands to the one or more shared resources 105A-C.

Figure 3:
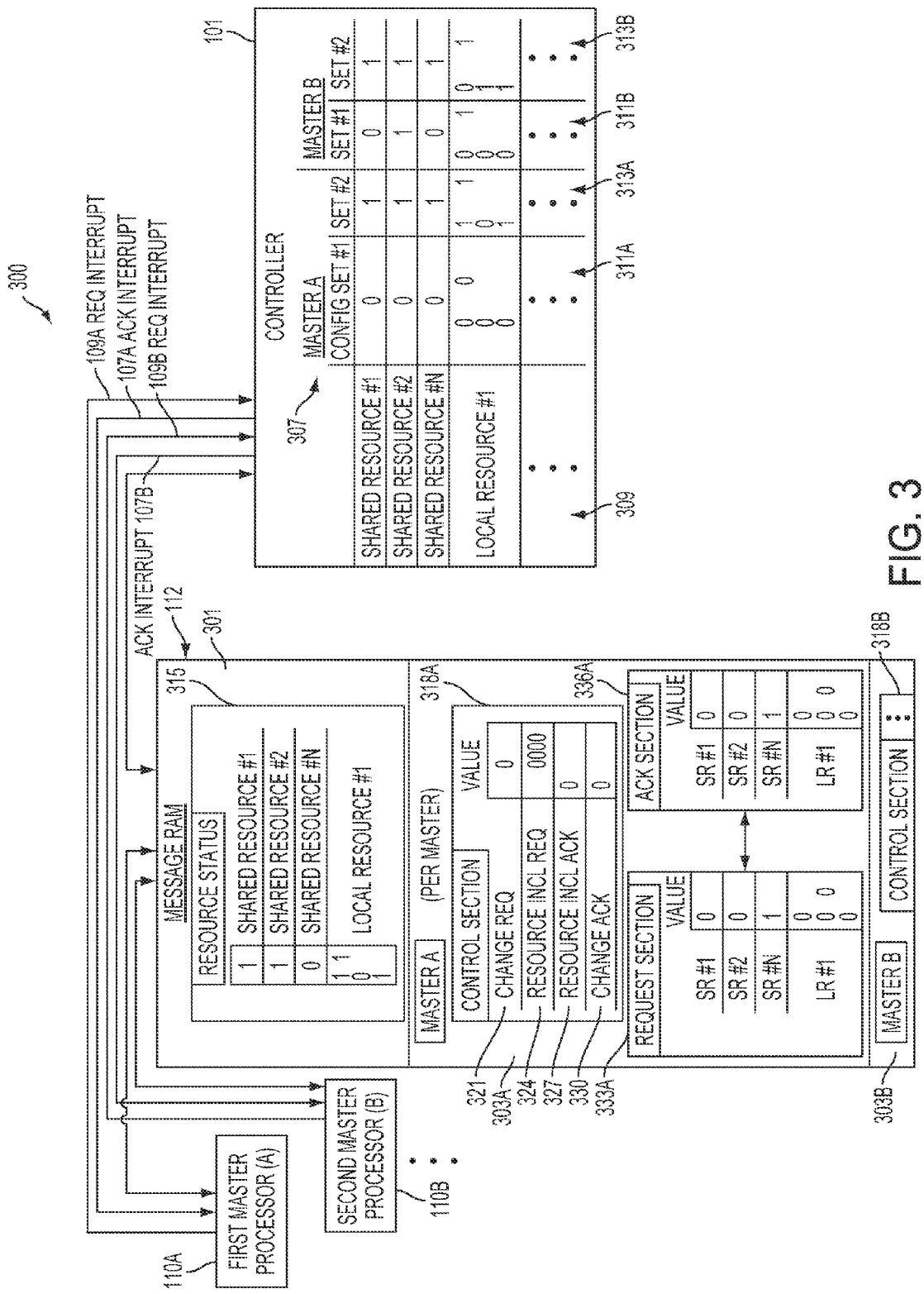
FIG. 3 is a functional block diagram illustrating details about the controller and message RAM.

FIG. 3 is a functional block diagram illustrating details about the controller 101 and message RAM 112 forming an interprocessor communication system 300. The controller 101 may be coupled to the first master processor 110A and the second master processor 110B, similar to the exemplary embodiment illustrated in FIG. 2. The controller 101 may be coupled to these processors 110A, 110B by request interrupt lines 109A, B and acknowledge interrupt lines 107A, B.

The controller 101 may also be coupled to message random access memory ("RAM") 112. The first master processor 110A and the second master processor 110B may also be coupled to the message RAM 112. While the exemplary embodiment uses the RAM type, other memory devices or a combination of memory devices may be employed as appreciated by one of ordinary skill in the art. Other memory devices include, but are not limited to, dynamic random access memory ("DRAM") "off-chip" 102, static random access memory ("SRAM") "on-chip" 122, cache memory, electrically erasable programmable read only memory ("EEPROM"), etc.

The controller 101 may maintain in its internal memory one or more tables 307 that comprise one or more configuration sets 311, 313. The controller's internal memory may comprise a memory device such as RAM. The one or more configuration sets 311, 313 list various states of resources 105 that are associated and required by a particular master processor 110.

For example, table 307 may comprise a first configuration set 311A and a second configuration set 313A that lists states for a plurality of resources 105 enumerated in a list 309. This first configuration set 311A and second configuration set 313A may be assigned to the first master processor 110A of FIG. 2. Meanwhile, a third configuration set 311B and fourth configuration set 313B may be assigned to the second master processor 110B of FIG. 2.

Each configuration set 311, 313 lists a state desired by a master processor 110 for a particular resource 105. The exemplary configuration sets 311, 313 illustrated in FIG. 3 demonstrate that a particular resource 105 may have one or more settings for a particular state. For example, the first local resource (Local Resource #1) for the first configuration set 311A as illustrated in FIG. 3 comprises at least four settings. These settings may comprise numeric values that correspond to particular states of a resource 105. Meanwhile, the first shared resource (#1) may only comprise a single setting for each configuration set 311, 313.

In the exemplary embodiment illustrated in FIG. 3, a zero may designate an "off" state while the number one may designate an "on" state. The numeric values are not limited to only binary states and may include other values, such as alpha-numeric, and numerical values in the hundreds or thousands. For example, numeric values may include settings like 100 or 200 to designate clock speeds in MHz or GHz as understood by one of ordinary skill the art.

Each first configuration set 311 may comprise an active set which is a default set for a particular master processor 110 while the processor 110 is operating in a normal fashion. Each second configuration set 313 corresponding to a master processor 110 may comprise a sleep set which is a set designated for low-level power consumption or a sleep state for a particular processor 110. As illustrated in FIG. 3, the controller 101 is coupled to message RAM 112. Message RAM 112 may include a first portion 301 that includes a resource status section 315. The resource status section 315 lists the current aggregate state of all resources 105 that are managed by the controller 101. The resource status section 315 in the exemplary embodiment illustrated in FIG. 3 may comprise a table having a single column. This single column table lists values corresponding to the status of each resource 105 that may be managed by the controller 101.

In the exemplary embodiment illustrated in FIG. 3, the status section 315 reflects that the first shared resource (#1) 105A has a status value of "1", while the second shared resource (#2) 105B has a status value of "1." The Nth shared resource (#N) 105C has a status value of "0", while the first local resource (#1) 105D has four status values of "1, 0, 1, and 1" respectively. While only four resources 105 are illustrated in the resource status section 315 of the exemplary embodiment of FIG. 3, one of ordinary skill the art recognizes that usually all resources 105 managed by the controller 101 are presented in the resource status section 315.

The resource status section 315 may be accessed by the controller 101. The controller 101 may write and read to the resource status section 315. Meanwhile, each master processor 110 may only read information from the resource status section 315 to obtain status of resources 105 that are of interest to a particular processor 110, 126.

Message RAM 112 may further comprise additional portions 303, also referred to as per-master regions. The per-master regions 303 correspond to each master processor 110, 126 and the requests issued from a single master processor 110, 126.

For example, a first per-master region 303A of the message RAM 112 may comprise sub-sections 318A, 333A, and 336A that directly correspond with operations and requests originating from the first master processor 110A. Similarly, a second per-master region 303B of the message RAM 112 may also comprise sub-sections such as a second control section 318B and as well as others (not illustrated) that are similar to the three provided in the first per-master region 303A of the message RAM 112.

Each per-master region 303 of the message RAM 112 tracks the state of requests from a single master processor 110, 126. The three sub-sections of each per-master region 303 within the message RAM 112 include a control section 318, a request section 333, and an acknowledgment section 336.

Each control section 318 may comprise at least four status fields: a change request field 321, a resource indication request field 324, a resource indication acknowledgment field 327, and a change acknowledgment field 330. Both the controller 101 and an assigned, single master processor 110 or 126 may read and write to the fields contained within this control section. Therefore, for the first control section 318A that is assigned to the first master processor 110A, the first master processor 110A and controller 101 and only the first master processor 110A and controller 101 (not any other master 110) may both read and write to the four fields 321, 324, 327, and 330 of the control section 318A.

The second subsection 333A of the first per-master region 303A of the message RAM 112 may comprise a request section 333A. Similar to the control section 318A of the first per-master region 303A, only the controller 101 and the first master processor 110A may interact with the request section 333A. However, only the assigned master processor 110A may write to the request section 333A. The controller 101 may only read the values contained within the request section 333A. In the exemplary embodiment illustrated in FIG. 3, the first shared resource (SR#1) 105A has a request section status value of "0." The second shared resource (SR#2) 105B also has a status value of "0." The Nth shared resource (SR#N) has a status value of "1," while the first local resource (LR#1) has status values of four zeros.

The third subsection 336B is the acknowledgment section 336B. The acknowledgement section 336B of the first per-master region 303A lists values corresponding to previous requests made to particular resources 105. Typically, the values of this acknowledgment section 336B mirror the values provided in the request section 333A.

Figure 4A:
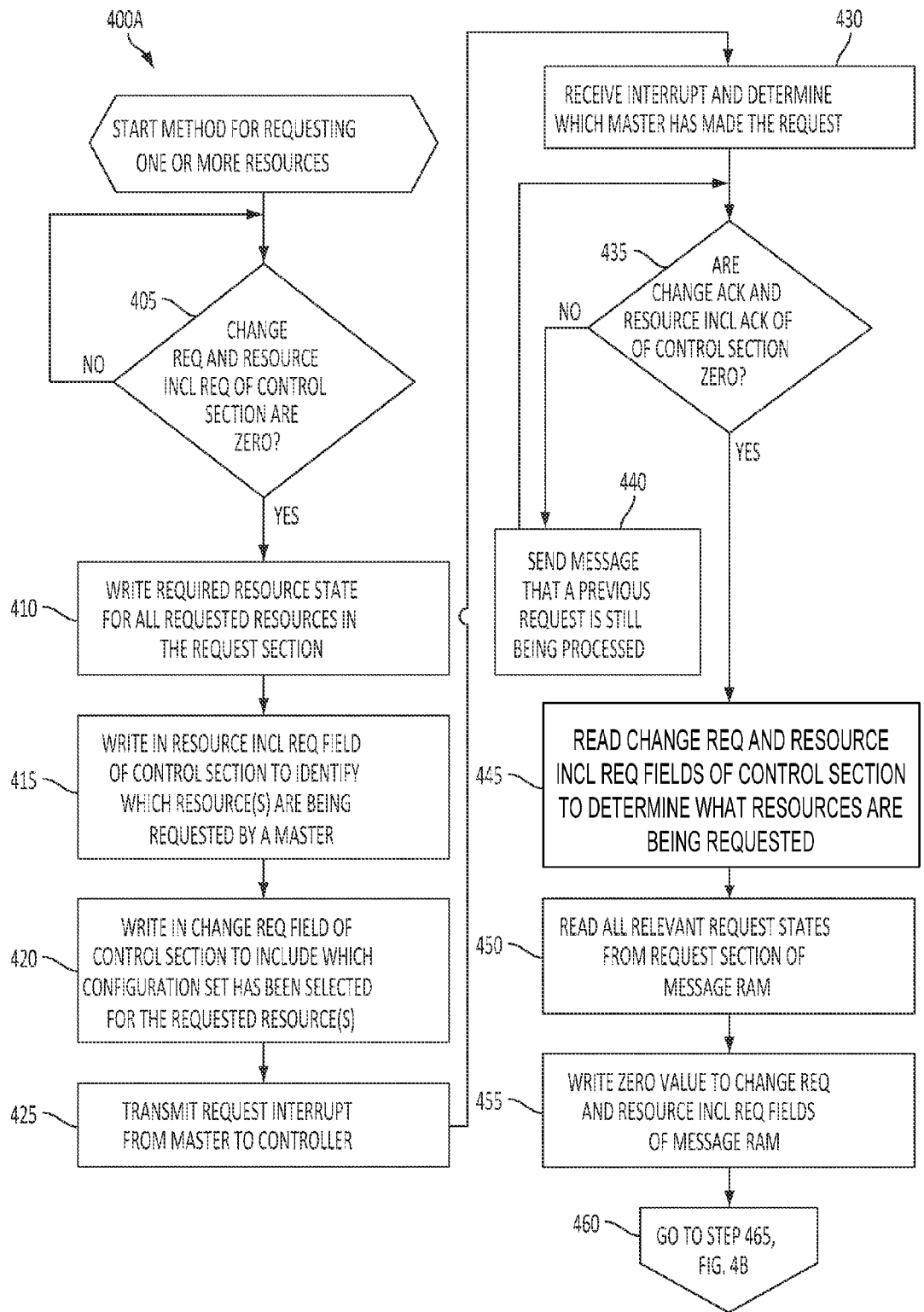
FIG. 4A-4B are logical flowcharts illustrating a method for managing requests among one or more master processors.
Figure 4B:
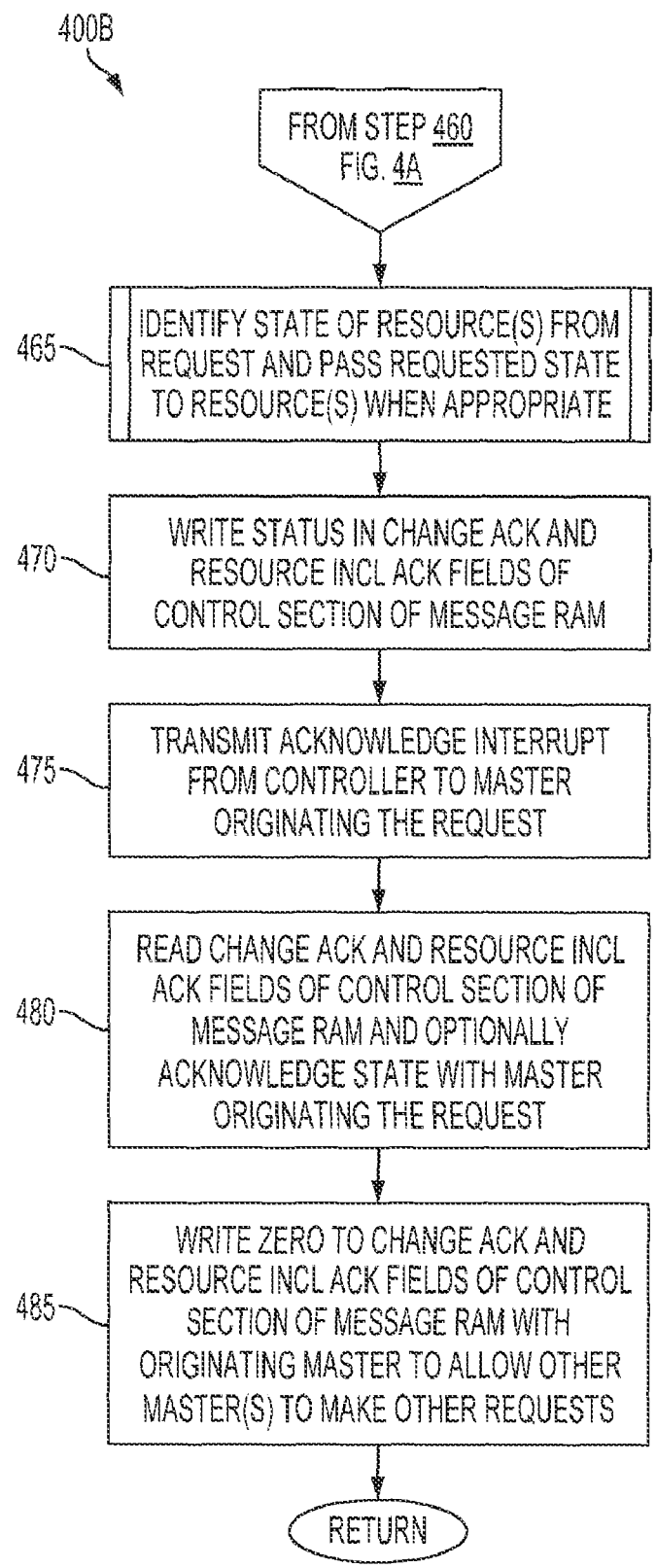

FIG. 4A and FIG. 4B are logical flowcharts 400A, 400B illustrating a method 400 for managing requests among one or more master processors 110, 126. Decision block 405 is the first step of the method 400. In decision block 405, the a requesting master processor 110 or 126 determines if the change request field 321 and resource indication request field 324 of the control section 318 in the message RAM 112 are equal to the value of zero. In this step, the master processor 110 or 126 is making sure a previous request that has not been completed and which originated from another processor 110, 126 is not overwritten in message RAM 112 by a current request.

If the inquiry to decision step 405 is negative, then the "NO" branch is followed back to the beginning of block 405 in a loop. If the inquiry to decision block 405 is positive, meaning that a previous request has been processed, then the "YES" branch is followed to block 410.

In block 410, the required resource state for all of the requested resources 105 is written by a requesting master processor 110 or 126 into the request section 333 of the master region 303 of the message RAM 112 as illustrated in FIG. 3. Next, in block 415, values are written into the resource indication request field 324 by a master processor 110 or 126 to indicate which resources 105 are being requested by the master 110 or 126.

In block 420, values are written into the change request field 321 of the control section 318 in the message RAM 112 to identify which configuration set 311 or 313 has been selected for the requested resources 105. Next, in block 425, the requesting master processor 110 or 126 transmits a request interrupt along one of the request interrupt lines 109 to the controller 101.

In block 430, the controller 101 receives the request interrupt from the request interrupt line 109 and determines which master 110 or 126 has made the request. Next, in decision block 435, the controller 101 determines if the change acknowledgment field 330 and the resource indication acknowledgment field 327 have values of zero. In this step, the controller 101 is determining if a prior request is still being processed before the controller 101 starts to manage or process a request.

If the inquiry to decision block 435 is negative, then the "NO" branch is followed to block 440 in which the controller 101 sends a message back to the requesting master processor 110 or 126 that a previous request is still being processed by the system. After block 440, the method 400 returns back to the start of block 435. If the inquiry to decision block 435 is positive, meaning that the change acknowledgment field 330 and resource indication acknowledgment field 327 have values of zero, then the method 400 proceeds to block 445.

In block 445, the controller 101 reads the change request field 321 and the resource indication request field 324 of the control section 318 in the message RAM 112 in order to identify what resources 105 have been requested. Next, in block 450, the controller 101 reads all relevant request states from the request section 333 of the message RAM 112 and caches (stores) these values locally within the controller 101. Next, in block 455, the controller 101 writes a zero value to the change request field 321 and to the resource indication field 324 of the control section 318 in the message RAM 112.

The method 400 continues from block 455 to block 460 in which the method 400 resumes at process or routine block 465 of FIG. 4B. The process or routine block 465 of FIG. 4B may comprise a plurality of steps that are described in further detail below in connection with FIG. 5. In process block 465, the controller 101 identifies the desired states for each resource 105 from the request originating from a master processor 110 or 126. The controller 101 then passes the requested state(s) to the one or more resources 105 if and when appropriate.

After process or routine block 465, in block 470, the controller 101 may write a status of the resources 105 that were changed by the request in the change acknowledgement field 330 and resource indication acknowledgment field 327 of the message RAM 112.

Next, in block 475, the controller 101 may transmit an acknowledge interrupt along one of the acknowledge interrupt lines 107 of FIG. 3 to the master 110 or 126 that originated the request. In block 480, the change acknowledgement field 330 and resource indication acknowledgment field 327 of the control section 318 of the message RAM 112 may be read by the master processor 110 or 126 receiving the acknowledge interrupt. These fields 330 and 327 may comprise the current values of states associated with the resources 105 which were requested by the master processor 110 or 126. The master processor 110 or 126 may optionally acknowledge the state of these two fields by sending a message to the controller 101.

In block 485, the master processor 110 or 126 that received the acknowledge interrupt may then write zeros to the change acknowledgment field 330 and the resource indication acknowledgment field 327 of the control section 318 in the message RAM 112 to allow other master processors 110 or 126 to issue other requests to the resources 105. The method 400 may return and start back to decision block 405 as described above.

Figure 5:
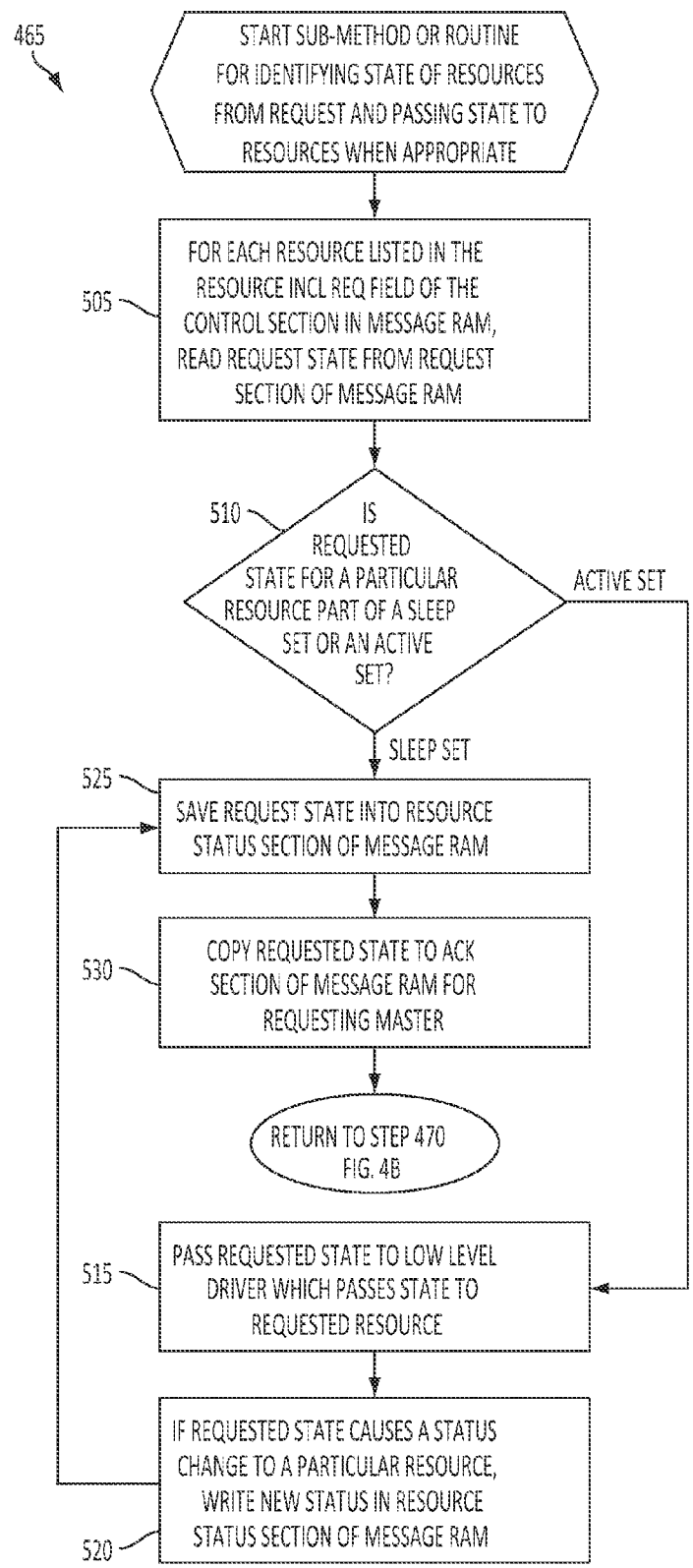
FIG. 5 is a logical flowchart illustrating a submethod or routine for identifying states of resources from a request and passing states to the resources when appropriate.

FIG. 5 is a logical flowchart illustrating a submethod or routine 465 (corresponding to FIG. 4B) for identifying states of resources 105 from a request and passing states to the resources 105 when appropriate. Block 505 is the first step of the submethod 465. In block 505, for each resource 105 listed in the resource indication request field 324 of the control section 318 in the message RAM 112, the requested state is read by the controller 101 from the request section 333 of the master portion 303 of the message RAM 112.

In the exemplary embodiment illustrated in FIG. 3, the first shared resource (SR#1) 105A has a requested state value of zero while the second shared resource (SR#2) 105B has a requested state value of zero too. The Nth shared resource (SR#N) 105C has a requested state value of one, while the first local resource (LR#1) 105D has four requested state values of zero.

Next, in decision block 510, the controller 101 determines if the requested state for a particular resource 105 is part of a sleep configuration set 311 or an active configurations set 313. If the inquiry to decision block 510 returns an "Active Set", then the "Active Set" branch is followed to block 515. If the inquiry to decision block 510 returns a "Sleep Set," then "Sleep Set" branch is followed to block 525.

In block 515, the controller 101 passes the requested state to one or more low-level drivers 103, which in turn, transmits the requested state to a particular resource, such as a shared resource 105A-105C or a local resource 105D-105G as illustrated in FIG. 2. Next, in block 520, if the requested state for a resource 105 causes a status change to a particular resource 105, the new status of the resource is written into the resource status section 315 of the message RAM 112 by the controller 101.

In block 525, the requested state is saved by the controller 101 into the resource status section 315 of the message RAM 112. In block 530, the requested state(s) are copied to the acknowledgment section 336 within message RAM 112. The sub-method 465 then returns to block 470 of FIG. 4B.

Figure 6:
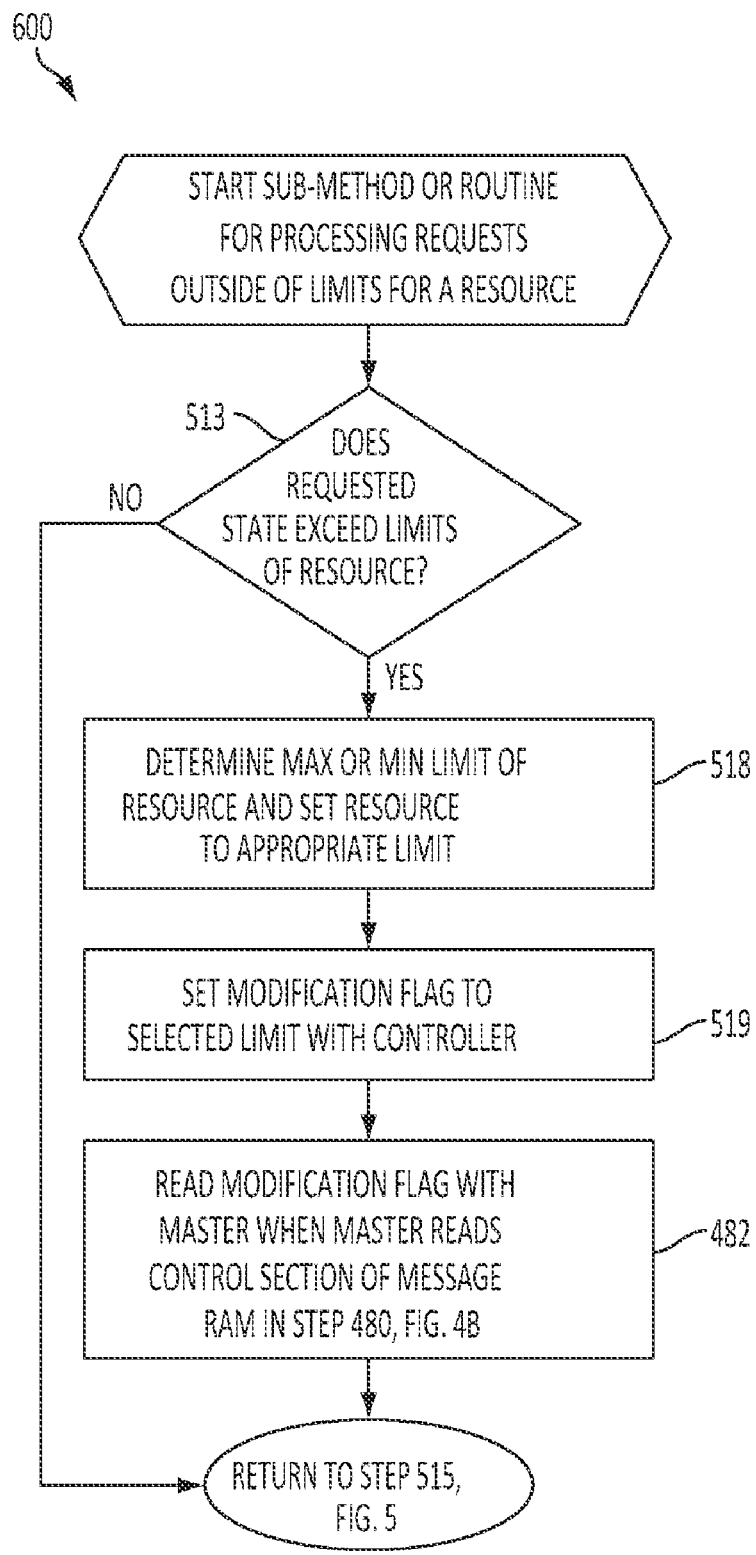
FIG. 6 is a submethod or routine for processing requests outside of limits for a resource.

FIG. 6 is a submethod or routine 600 for processing requests outside of limits for a resource 105. The submethod 600 includes blocks which have been numbered to correspond with the numbered blocks of the method 400 and submethod 465 as illustrated in FIG. 4A, FIG. 4B, and FIG. 5. Therefore, if a numbered block of the submethod 600 has a value greater than a corresponding numbered block of the method 400 or submethod 465, then the numbered block of the submethod 600 would occur after the corresponding numbered block of the method 400 or submethod 465.

For example, decision block 513 is the first step of submethod 600. Decision block 513 has a value which is greater than block 510 of submethod 465 and a value which is less than block 515. Therefore, decision block 513 would occur after decision block 510 but before block 515 of submethod 465 as understood by one of ordinary skill in the art.

In decision block 513, the controller 101 may determine if the requested state exceeds the limits of a resource 105. For example, if a particular resource 105 has a maximum clock speed of 800 MHz, and the requested state is 900 MHz, then this requested state exceeds the limits of this resource 105.

If the inquiry to decision block 513 is negative, then the "No" branch is followed and the submethod 600 returns to block 515 of submethod 465 in FIG. 5. If the inquiry to decision block 513 is positive, meaning that the requested state does exceed the limits of a particular resource 105, then the "Yes" branch is followed to block 518.

In block 518, the controller 101 may determine the maximum or minimum limit of a resource 105 and set the resource 105 to an appropriate limit that is closest to the requested state. So for the example noted above, if the maximum clock speed of a resource is 800 MHz, and the requested state is 900 MHz, then the controller 101 will set the clock speed to the maximum value of 800 MHz which is 100 MHz less than the requested state. In block 519, the controller 101 may set a modification flag to indicate the limit which was selected by the controller 101 for the requested state.

Block 482 follows block 519 since block 482 is now added to the method 400 of FIG. 4B after block 480. In block 482, which now follows block 480 of FIG. 4B, a master 110 or 126 originating an active request may read the modification flag set in block 519 when the when the master reads the control section 318 of the message RAM 112 of FIG. 3. The submethod 600 then returns to block 515 of FIG. 5.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the disclosed system and method. In some instances, certain steps may be omitted or not performed without departing from the method as understood by one of ordinary skill in the art. Further, words such as "thereafter", "then", "next", etc. are not intended to limit the order of the steps. These words are simply used to guide the reader through the description of the exemplary method.

For example, block 530 which requires the controller 101 copied the requested state to the acknowledgment section 336 of the message RAM 112 may be skipped entirely if the status of each resource 105 has not been changed. This elimination of block 530 may reduce processing time consumed by the controller 101.

As another example, certain steps may be changed to support a multi-thread environment. Particularly, decision block 435 in which the change acknowledgment field 330 and resource indication acknowledgment field 327 are reviewed by the controller 101 may be moved or shifted just prior to block 530 of FIG. 5. Similarly, additional techniques may be employed between or near steps as understood by one of ordinary skill in the art.

For example, an exponential backoff technique may be employed between block 440 and block 435. For a controller, it is allowed to check the state of the resources 105 in decision block 435. This means that a first pass between block 440 and block 435 may have a fixed duration of 100 milliseconds. A second pass between block 440 and block 435 may have a fixed duration of 200 milliseconds. A third pass between block 440 and block 435 may have a fixed duration of one second as understood by one of ordinary skill in the art.

FIGS. 7A-7B illustrate tables 700 that are part of notification meta-resources 105J for processors 110. The notification meta-resources 105J, and particularly the tables 700, may be stored and accessed in the request section 333 of the message RAM 112. In an exemplary embodiment, each processor 110 or 126 is assigned to its own individual notification meta-resource 105J, similar to the control section 318, the request section 333, and the acknowledgment section 336 which exist in each per-master region 303 of the message RAM 112.

Each notification meta-resource 105J allows a master processor 110 or 126 to sign up for receiving status reports for particular resources 105 that may be of interest to the master processor 110. A master processor 110 or 126 may write and record in the meta-resource 105J which resources 105 that it wants the controller 101 to generate status reports. The controller 101 reviews each meta-resource 105J corresponding to each master 110 or 126 to determine if the controller 101 needs to send a status report regarding a resource 105 to a particular master processor 110 or 126.

As illustrated in FIG. 7A, a notification meta-resource 105J may comprise a first row of configuration field values which correspond with each resource 105 that may be available to a particular master 110 or 126. The second row of a notification meta-resource 105J may comprise a registration field values which correspond with each resource 105 that may be available to a particular master 110 or 126. The configuration field defines notifications and the registration field defines how states from a primary set of notifications may be inherited.

In the exemplary embodiment illustrated in FIG. 7, the configuration field and registration field may comprise binary states: ones or zeros. A zero state in the configuration field indicates that a particular master processor 110 or 126 wishes to inherit its settings for resource change notifications. In this case, the state of the registration bit is not used, and notifications will be delivered or not based on the settings from the primary set.

A one state in the configuration field indicates that a particular master processor 110 or 126 does not want to inherit notification settings for a particular resource 105, but instead will explicitly configure notifications using the registration bit. In this case, a one state in the registration field indicates that a particular master processor 110 or 126 desires to receive the notifications about changes in a particular resource 105. Likewise, a zero state in the registration field indicates a desire to not receive notifications while in the current set, regardless of the setting in the primary set. Primary sets are discussed in further detail below.

A summary for the configuration and registration fields is provided in Table 1 below:

TABLE 1

Summary for Configuration and Registration Fields

| Configuration Field | Registration Field | Meaning |
|---|---|---|
| 0 | X | Inherit settings |
| 1 | 0 | Do not inherit, do not receive notification |
| 1 | 1 | Do not inherit, receive notification |

Each master processor 110 or 126 may have a plurality of notification meta-resources that are assigned to particular states of a particular master processor 110 or 126. For example, in the exemplary embodiment illustrated in FIG. 7B, three sets of notification meta-resources 105J1, 105J2, and 105J3 may be assigned to a particular master processor 110 or 126.

The first notification meta-resource 105J1 may comprise a particular master processor's primary set for notifications. The primary set may be the default set for how a particular master 110 or 126 desires to be notified for particular resources 105 in which the master processor 110 or 126 has an interest. Both rows of the first column of the primary set 105J1 have a value of one to indicate that the master processor 110 or 126 assigned to this notification meta-resource 105J desires to receive notifications for the first shared resource (SR#1) 105A.

Both rows of the fourth column of the primary set 105J1 have a value of one to indicate that the master processor 110 or 126 assigned to this notification meta-resource 105J desires to receive notifications for the first local resource (LR#1) 105D.

The second and third sets 105J2 and 105J3 of the notification meta-resources may comprise sleep sets as understood by one of ordinary skill in the art. For example, the configuration field in the first row of the second and third columns of the third set 105J3 may have a value of zero to indicate that the master processor 110 or 126 assigned to this meta-resource 105J3 wishes to inherit any notifications with respect to the second (SR#2) 105B and third shared resources (SR#3) 105C. In this example, the primary set configuration for SR#2 105B and SR#3 105C also indicate that no notification should be delivered. Meanwhile, the configuration field in the first row of the first and fourth columns are one to indicate that the master processor 110 or 126 assigned to this meta-resource 105J3 does not wish to inherit from the primary set. In this case, there will be notifications for LR#1 105C since the registered bit in the second row of the fourth column is one. There will not be any notifications delivered for SR#1 105A since the registered bit in the second row of the first column is zero.

The presence of two rows in a particular notification meta-resource 105J is to allow differentiation between a value which has no preference (and should be therefore inherited from the primary set) and a value which has been explicitly set. Generally, a master processor 110 or 126 will configure its notifications in the primary set 105J1 and expect those notifications to be honored at all times. However, it is possible that the master processor 110 or 126 may want a different configuration while asleep, but only for some resources 105. Therefore, a single piece of information is insufficient to construe the three possible states: inherit, explicitly register to receive additional notification in sleep, or explicitly deregister to not receive notification in sleep even if the notification would be delivered via the primary set.

Figure 8:
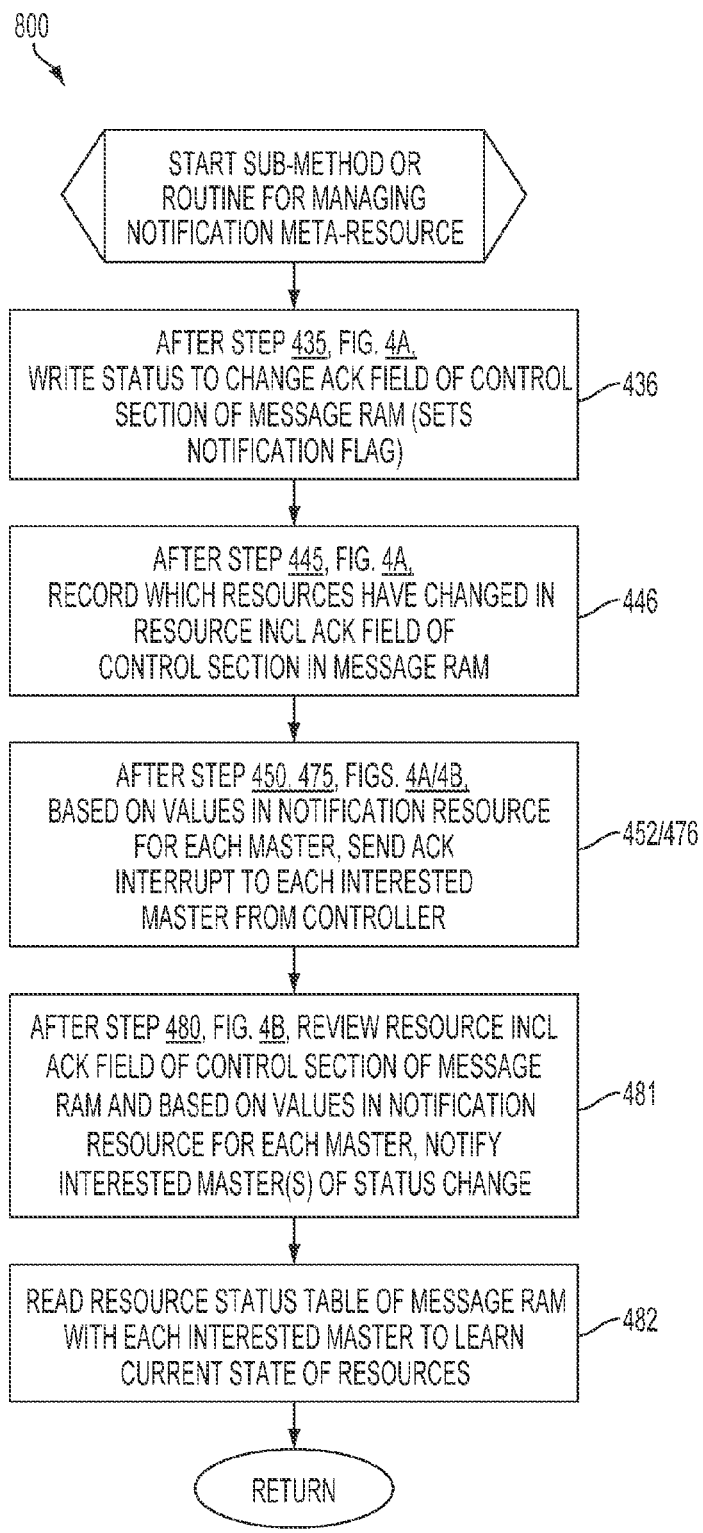
FIG. 8 is a logical flowchart illustrating a submethod or subroutine for managing notification meta-resources.

FIG. 8 is a logical flowchart illustrating a submethod or subroutine 800 for managing notification meta-resources 105J. The steps of submethod 800 generally refer to several steps of the method 400 illustrated in FIGS. 4A-4B. Block 436 is the first step of submethod 800.

Block 436 occurs after the "YES" branch is followed from decision block 435. In block 436, the controller 101 writes the status of the resources 105 to the change acknowledgment field 330 of the control section 318 of the message RAM 112. This action by the controller 101 sets a notification flag.

While subroutine 800 has been described as integrated with method 400, one of ordinary skill in the art recognizes that a request to the controller 101 is not needed in order for a notification of resource change to occur. After step 435, a new state in which the status of one or more resources changes may occur if a master processor 110 or 126 requested a new state, or some state internal to the controller 101 changed. It is understood to one of ordinary skill in the art that notifications may originate asynchronously relative to requests made to a master processor 110 or 126.

Next, in block 446, which occurs after block 445 of FIG. 4A, the controller 101 records which resources 105 have changed in the resource indication acknowledgment field 327 of the control section 318 in the message RAM 112. Next, in block 452/476, which occurs after steps 450 and 475 of FIGS. 4A-4B, based on the values in the notification meta-resource 105J assigned for each master processor 110 or 126, the controller 101 sends an acknowledge interrupts to each interested master processor 110 or 126. This means that block 446 occurs after block 450 of FIG. 4A and block 475 of FIG. 4B.

Next, in block 481, after step 480 of FIG. 4B, the controller 101 reviews the resource indication acknowledgment field 327 of the control section 318 of the message RAM 112 and based on values in the notification meta-resource 105J for each master 110 or 126, the controller notifies interested master(s) of a status change.

Next, in block 482, each master 110 or 126 reads the resource status section 315 of the message RAM 112 to learn the current state of the resources 105.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing requests to resources among master processors of a portable computing device comprising:
receiving, from a master processor, an alert indicating that a plurality of resources for servicing the master processor are identified, and that desired states for the plurality of resources are identified, wherein identifications of the plurality of resources and the desired states are stored in a storage device that is part of the portable computing device;
determining if one or more previous requests to resources have been processed to completion;
if the one or more previous requests to resources have been processed to completion, then reviewing contents of the storage device to identify the plurality of resources and to identify the desired states of the resources;
passing the desired states to the plurality of resources; and
reviewing one or more stored tables that establish a meta-resource, wherein the one or more stored tables list a plurality of resources and fields that indicate whether the master processor should be notified of status changes to the resources.

2. The method of claim 1, further comprising determining if the desired states for the plurality of resources are part of a sleep set or an active set.

3. The method of claim 1, further comprising recording a desired state in the storage device if the desired state causes a status change for a resource.

4. The method of claim 1, wherein a resource comprises at least one of a clock and a processor that support tasks, commands, or features of software applications that are executed by one or more master processors.

5. The method of claim 1, wherein at least one resource is a resource that is shared among at least two master processors.

6. The method of claim 1, further comprising determining if a desired state exceeds a limit of a resource.

7. The method of claim 6, wherein if a desired state exceeds a limit of a resource, then adjusting a value of the desired state so that the value falls within the limit of the resource.

8. The method of claim 7, further comprising generating an alert that a desired state has been adjusted so that the value derived from the desired state falls within the limit of the resource.

9. The method of claim 1, further comprising sending alerts of status changes for resources to one or more master processors based on values in the meta-resource that are assigned to each master processor of the portable computing device.

10. A computer system for managing requests to resources among master processors of a portable computing device, the system comprising:
 a master processor operable to:
  identify a plurality of resources for servicing the master processor;
  identify desired states for the plurality of resources, wherein identifications of the plurality of resources and of the desired states are stored in a storage device that is part of the portable computing device; and
  generate an alert indicating that the plurality of resources and the desired states are identified; and
 a controller operable to:
  receive the alert;
  determine if one or more previous requests to resources have been processed to completion;
  review contents of the storage device to identify the plurality of resources and to identify the desired states of the resources if the one or more previous requests have been processed to completion;
  pass the desired states to the plurality of resources; and
  review one or more stored tables that establish a meta-resource, wherein the one or more stored tables list a plurality of resources and fields that indicate whether the master processor should be notified of status changes to the resources.

11. The system of claim 10, wherein the controller is further operable to:
 determine if the desired states for the plurality of resources are part of a sleep set or an active set.

12. The system of claim 10, wherein the controller is further operable to:
 record a desired state in the storage device if the desired state causes a status change for a resource.

13. The system of claim 10, wherein a resource comprises at least one of a clock and a processor that support tasks, commands, or features of software applications that are executed by one or more master processors.

14. The system of claim 10, wherein at least one resource is a resource that is shared among at least two master processors.

15. The system of claim 10, wherein the controller is operable to:
 determine if a desired state exceeds a limit of a resource.

16. The system of claim 15, wherein if a desired state exceeds a limit of a resource, then the controller is further operable to adjust a value of the desired state so that the value falls within the limit of the resource.

17. The system of claim 10, wherein the controller is further operable to:
 generate an alert that a desired state has been adjusted so that the value derived from the desired state falls within the limit of the resource.

18. The system of claim 10, wherein the controller is further operable to:
 send alerts of status changes for resources to one or more master processors based on values in the meta-resource that are assigned to each master processor of the portable computing device.

19. A computer system for managing one or more memory resources of a wireless handheld computing device, the system comprising:
 means for receiving, from a master processor, an alert indicating that a plurality of resources for servicing the master processor are identified, and that desired states for the plurality of resources are identified, wherein identifications of the plurality of resources and the desired states are stored in a storage means that is part of the portable computing device;
 means for determining if one or more previous requests have been processed to completion;
 means for reviewing contents of the storage device to identify the plurality of resources and to identify the desired states of the resources if the one or more previous requests have been processed to completion;
 means for passing the desired states to the plurality of resources; and
 means for reviewing one or more stored tables that establish a meta-resource, wherein the one or more stored tables list a plurality of resources and fields that indicate whether the master processor should be notified of status changes to the resource.

20. The system of claim 19, further comprising:
 means for determining if the desired states for the plurality of resources are part of a sleep set or an active set.

21. The system of claim 19, further comprising means for recording a desired state in the storage device if the desired state causes a status change for a resource.

22. The system of claim 19, wherein a resource comprises at least one of a clock and a processor that support tasks, commands, or features of software applications that are executed by one or more master processors.

23. The system of claim 19, wherein at least one resource is a resource that is shared among at least two master processors.

24. The method of claim 19, further comprising means for determining if a desired state exceeds a limit of a resource.

25. The system of claim 24, further comprising:
 means for adjusting a value of the desired state so that the value falls within the limit of the resource if a desired state exceeds a limit of a resource.

26. The system of claim 19, further comprising:
 means for generating an alert that a desired state has been adjusted so that the value derived from the desired state falls within the limit of the resource.

27. The system of claim 19, further comprising means for sending alerts of status changes for resources to one or more master processors based on values in the meta-resource that are assigned to each master processor of the portable computing device.

28. A non-transitory computer-readable storage medium having stored thereon software instructions configured to cause a controller of a computer system to perform operations comprising:
 receiving, from a master processor, an alert indicating that a plurality of resources for servicing the master processor are identified, and that desired states for the plurality of resources are identified, wherein identifications of the plurality of resources and desired states are stored in a storage device that is part of the portable computing device;

determining if one or more previous requests to resources have been processed to completion;

if the one or more previous requests to resources have been processed to completion, then reviewing contents of the storage device to identify the plurality of resources and to identify the desired states of the resources;

passing the desired states to the plurality of resources; and reviewing one or more stored tables that establish a meta-resource, wherein the one or more stored tables list a plurality of resources and fields that indicate whether the master processor should be notified of status changes to the resources.

29. The non-transitory computer-readable storage medium of claim 28, wherein the stored software instructions are further configured to cause the controller to perform operations comprising:

determining if the desired states for the plurality of resources are part of a sleep set or an active set.

30. The non-transitory computer-readable storage medium of claim 28, wherein the stored software instructions are further configured to cause the controller to perform operations comprising:

recording a desired state in the storage device if the desired state causes a status change for a resource.

31. The non-transitory computer-readable storage medium of claim 28, wherein a resource comprises at least one of a clock and a processor that support tasks, commands, or features of software applications that are executed by one or more master processors.

32. The non-transitory computer-readable storage medium of claim 28, wherein at least one resource is a resource that is shared among at least two master processors.

33. The non-transitory computer-readable storage medium of claim 28, wherein the stored software instructions are further configured to cause the controller to perform operations comprising:

determining if a desired state exceeds a limit of a resource.

34. The non-transitory computer-readable storage medium of claim 33, wherein the stored software instructions are further configured to cause the controller to perform operations comprising:

adjusting a value of the desired state so that the value falls within the limit of the resource if a desired state exceeds a limit of a resource.

35. The non-transitory computer-readable storage medium of claim 28, wherein the stored software instructions are further configured to cause the controller to perform operations comprising:

generating an alert that a desired state has been adjusted so that the value derived from the desired state falls within the limit of the resource.

36. The non-transitory computer-readable storage medium of claim 28, wherein the stored software instructions are further configured to cause the controller to perform operations comprising:

sending alerts of status changes for resources to one or more master processors based on values in the meta-resource that are assigned to each master processor of the portable computing device.

* * * * *